United States Patent [19]

Heck et al.

[11] Patent Number: 4,835,013

[45] Date of Patent: May 30, 1989

[54] PROCESS OF MANUFACTURING A SUBSTRATE PROVIDED WITH A SYNTHETIC RESIN-BONDED FRICTION COATING

[75] Inventors: Friedrich Heck, Lienen, Fed. Rep. of Germany; Gerhard Kapl, Linz, Austria

[73] Assignee: Miba Sintermetall Aktiengesellschaft, Laakirchen, Austria

[21] Appl. No.: 159,375

[22] Filed: Feb. 23, 1988

[30] Foreign Application Priority Data

Feb. 25, 1987 [AT] Austria .................................. 409/87

[51] Int. Cl.$^4$ ................................................ B05D 3/00
[52] U.S. Cl. .................................. 427/295; 156/245; 264/131
[58] Field of Search ................ 427/195; 264/131, 134, 264/135

[56] References Cited

U.S. PATENT DOCUMENTS

| Re. 32,595 | 2/1988 | Davies | 427/195 |
| 3,264,131 | 8/1966 | Nagel | 427/195 |
| 4,035,215 | 6/1977 | Goldstone | 427/195 |
| 4,158,073 | 6/1979 | Schneider | 427/195 |

FOREIGN PATENT DOCUMENTS 2832464  2/1979  Fed. Rep. of Germany .

Primary Examiner—Sam Silverberg
Attorney, Agent, or Firm—Kurt Kelman

[57] ABSTRACT

In a process of manufacturing a substrate provided with a synthetic resin-bonded friction coating, the friction coating, which is joined to the substrate by a primer is formed in that a powder mixture which contains a friction powder and a synthetic resin powder is compacted and is cured at an elevated temperature.

To eliminate the need for precompacting the powder mixture before it is applied to the substrate, said powder mixture is applied to the substrate to form a powder layer which can be compacted to the desired thickness of the friction coating. The powder layer which has been applied is then heated for a short time before the powder layer is compacted to the desired thickness of the friction coating.

5 Claims, No Drawings

PROCESS OF MANUFACTURING A SUBSTRATE PROVIDED WITH A SYNTHETIC RESIN-BONDED FRICTION COATING

BACKGROUND OF THE INVENTION

1. Field of the Invention

This invention relates to a process of manufacturing a substrate provided with a synthetic resin-bonded friction coating, bonded to the substrate by a primer. The coating is made by compacting a powder mixture containing a friction imparting powder material and a thermosetting synthetic resin powder and curing the compacted powder mixture at an elevated temperature. That process may be used to manufacture elements designed to move in frictional contact with other elements in such mechanisms, as brakes and clutches.

2. Description of the Prior Art

It is known that substrates may be provided with synthetic resin-bonded friction coatings by first preparing a suitable dry powder mixture of a suitable friction imparting powder material and of a binder consisting of a synthetic resin powder and then precompacting the powder mixture to form a compact. The substrate is placed into a metal die, the compact is placed on the substrate, and the compact and the substrate are then molded at an elevated temperature. To join the compact to the substrate, the latter is suitably coated after a sandblasting treatment with a primer, which may consist of an adhesive. After the hot molding, the substrates provided with the friction coating are ejected from the metal mold and are usually placed into furnaces in which the friction coating is cured. After the curing in the furnace, the friction coatings are machined exactly to the desired dimensions. Those known manufacturing processes have the disadvantage that the dry powder mixture must be precompacted because it has a relatively large volume and said compacts cannot conveniently be handled unless they have a minimum thickness so that thin friction coatings, cannot be formed unless the friction coatings are machined after they have been cured. The extent to which the powder mixture is compacted will depend on the pressure applied which control the porosity of the friction coating.

SUMMARY OF THE INVENTION

It is an object of the invention to avoid these disadvantages and so to improve such a process will be simplified and machining of the friction coatings which have been molded and cured at elevated temperature will not be required in most cases.

That object is accomplished in accordance with the invention by applying the powder mixture to the substrate in such a thickness that, after the desired compaction, the powder layer will have the thikcness desired for the final friction coating. The powder layer is then heated above the melting range of the thermosetting synthetic resin and is subsequently compacted to the desired thickness of the friction coating before the synthetic resin has been cured to a degree which would adversely affect the compacting of the powder layer.

As a result of the heating of the powder layer above the melting range of the thermosetting synthetic resin, the individual particles of the powder layer are adhesively bonded to each other and to the substrate within a short time so that the hot powder layer has a dimensional stability which is sufficient for a satisfactory handling of the powder layer. Therefore it is not necessary to precompact the powder mixture and to apply the resulting compact to the substrate but the uncompacted powder mixture can be applied to the substrate to form a powder layer which can be compacted as desired to form a final friction coating having the desired thickness. When the powder layer which has been formed on the substrate is subsequently compacted to the desired final thickness, which may be controlled by suitable spacers, the resulting friction coating will have the desired final thickness and the desired porosity regardless of the compacting force which is exerted. As a result, the subsequent machining otherwise required can be omitted, particularly if any grooves or beads to be formed in the friction coating are formed thereon as it is compacted. The skin which is formed on the compacted friction coating owing to the use of a release agent can easily be removed by a slight grinding of the surface of the coating.

It will be understood that the powder layer must be compacted to the desired final thickness before the powder layer has been cured to a degree which would adversely affect the subsequent compaction. For this reason the powder layer is maintained at a temperature in excess of the melting range only for a short time before said layer is finally compacted and the progress of the curing may be controlled by a cooling of the layer. If the powder layer containing one of the conventional synthetic resin powders is maintained at a temperature between 70° and 220° C. for 1 to 10 minutes before it is compacted, the powder layer will assume the desired dimensional stability. After that heat treatment, the powder layer can be compacted at an average temperature between 180° and 220° C. and the workpiece can be cured at a temperature between 150° and 230° C.

The bond between the applied powder layer and the substrate and the bond between the particles of the powder mixture can be improved in accordance with the invention by pressing the powder layer to the substrate during or after the heating of the powder layer but before the powder layer is compacted. The application of such pressure will improve the interlock between the friction layer and the primer provided on the substrate. Because the particles of the synthetic resin powder contract as they soften, they may lose contact with the adjoining particles of the powder mixture which impairs the bonding of said friction imparting powder material particles. By the application of an adequate pressure, the spacing of the particles may be sufficiently reduced so that the particles of the friction imparting powder material will be adequately bonded. The desired result can generally be ensured by the application of pressure between $5 \times 10^{-3}$ to $10 \times 10^{-3}$ N/mm².

Such a temporary urging of the powder layer against the substrate will be particularly desirable if the substrate is to be provided with friction coatings on both sides because in that case the first powder layer which has been applied to the substrate and has been heated for a short time above the melting range will be subjected to a greater stress as the workpiece is handled to invert the substrate to apply the seconde powder layer. In most cases the second powder layer need not be urged against the substrate after it has been heated above the melting range because the workpiece can be placed immediately thereafter into a mold for jointly compacting the two powder layers.

The porosity of the friction coating which has been compacted to the desired final thickness will depend on the quantity in which said powder is applied per unit of area of the substrate. That porosity may be reduced, if desired, by impregnating the powder layer which has been compacted to the desired final thickness with a liquid resin and thereafter fully curing at an elevated temperature. An interstage drying may be performed. That subsequent impregnation of the friction coating with a liquid resin will further consolidate the friction coating, as will be desirable if the powder layer has been cured to such a degree before its compaction that resin bridges which have formed may be destroyed by the compaction.

The powder mixture must be applied to the substrate in a controlled quantity to form a powder layer having a predetermined thickness. For this reason the mixture consisting of the friction imparting powder material and of the synthetic resin powder must be freely flowable or easily spreadable and must not contain fibers. Such mixture may contain petroleum coke in a relatively large quantity of, e.g., 70% by weight.

That surface or those surfaces of the support which is or are to be coated may be provided with a primer which may consist of a viscous adhesive resin, such as a phenol resin, in a thickness of about 0.1 mm. A rough powder which preferably consists of the main friction imparting powder material component of the powder mixture may be sprinkled onto said primer and may have a sieve particle size in a narrow range of, e.g., 0.15 to 0.20 mm. The quantity in which said rough powder is sprinkled is so controlled that the rough powder covers only about 30 to 40% of the area on which it is sprinkled. The powder layer can then be sprinkled on said adhesive resin layer before the latter has fully been cured. It will be understood that the primer may consist of a resin powder, such as an epoxy resin, rather than of a viscous adhesive resin, and the mixture containing the friction imparting powder material is preferably applied directly to the resin powder so that the powder mixture will be heated jointly with the primer powder.

DESCRIPTION OF THE PREFERRED EMBODIMENTS

EXAMPLE 1

A powder mixture consisting of 77% by weight graphite, 15% by weight zircon sand and 8% by weight phenol resin was sprinkled in a quantity of 0.14 g/cm$^2$ on a suitably pretreated sheet steel substrate that has been provided with a primer layer. The resulting powder layer had a thickness of 1.8 mm and was then maintained at 250° C. for 15 seconds. Thereafter the powder layer was urged against the support under a pressure of $5 \times 10^{-3}$ N/mm$^2$. The substrate was subsequently coated in the same manner on the opposite side. When the sheet steel had been coated on both sides, it was pressed by means of profiled punches at a temperature of about 200° C. to compact the two powder layers to a final thickness of 1.15 to 1.20 mm each. The time for which each powder layer is to be maintained at a temperature above the melting range of the synthetic resin can be determined from a conspicuous color change of the powder layer. The powder layers were then fully cured at a temperature of 170° C. for one hour.

EXAMPLE 2

A powder mixture consisting of 25 parts by weight copper, 11 parts by weight zinc, 13 parts by weight iron, 30 parts by weight graphite, 8 parts by weight zircon sand and 7 parts by weight phenol resin was sprinkled on the substrate in a quantity of 0.24 g/cm$^2$ to form a powder layer having a thickness of 1.8 mm. The same conditions as in Example 1 were used in other respects. The resulting layer was maintained at a temperature of 250° C. for 15 seconds and was subsequently urged against the substrate to reduce the thickness of the layer to 1.6 mm. The powder layer was subsequently compacted at a temperature of 200° C. to form a friction coating having a final thickness between 1.2 and 1.25 mm. That compacted friction coating was impregnated with a solution of phenol resin in methanol. The impregnated friction coating was predried for 2 to 3 hours. The friction coating was then fully cured at a temperature of 150° C. within one hour.

EXAMPLE 3

A substrate which consisted of sheet steel and had properly been pretreated and provided with a primer was provided with a powder mixture consisting of 50% by weight petroleum coke, 20% by weight graphite, 20% by weight epoxide resin, 5% by weight zircon sand, 4% by weight cellulose and 1% by weight of a solid lubricant to form a powder layer having a thickness of 1.8 mm. When the layer had been maintained at a temperature of 110° C. for five minutes, the layer was urged against the substrate to reduce the thickness of the layer to 1.6 mm. The substrate was then similarly coated on the opposite side. The sheet steel coated on both sides was pressed at a temperature of about 200° C. by means of profiled punches provided with a release to compact each powder layer to a final thickness of 0.8 mm. The resulting friction coatings were then cured at 200° C. for three hours. The skin formed on the friction coatings by the release agent was removed by a slight grinding of the surfaces of the two coatings.

We claim:

1. A process of laminating a friction coating of a predetermined thickness to a substrate carrying an adhesive primer, which comprises the steps of
   (a) applying to the substrate carrying the adhesive primer a layer of a powder mixture of a friction-imparting powder material and a thermosetting synthetic resin powder having a predetermined melting temperature range,
   (b) heating the powder mixture layer on the substrate above the melting temperature range of the thermosetting synthetic resin powder to melt the synthetic resin,
   (c) compacting the heated layer on the substrate until it has reached the predetermined thickness before the melted synthetic resin has been cured to a degree which would adversely affect the compacting of the layer, (1) the powder mixture layer being applied to the substrate in a thickness resulting in the predetermined thickness of the friction coating after compacting, and
   (d) further heating the compacted heated layer until the thermosetting synthetic resin has been cured to obtain the friction coating.

2. The laminating process of claim 1, comprising the further step of pressing the powder mixture layer against the substrate carrying the adhesive primer before the heated layer is compacted.

3. The laminating process of claim 2, wherein the powder mixture layer is pressed against the substrate during the heating thereof.

4. The laminating process of claim 2, wherein the powder mixture layer is pressed against the substrate after the heating thereof.

5. The laminating process of claim 1, comprising the further step of impregnating the compacted heated layer with a liquid resin before it has been cured.

* * * * *